United States Patent
Ito et al.

(10) Patent No.: US 12,332,646 B1
(45) Date of Patent: Jun. 17, 2025

(54) STEERING CONTROL SYSTEM OF MARINE VESSEL, MARINE VESSEL AND STEERING CONTROL METHOD OF MARINE VESSEL

(71) Applicant: YAMAHA HATSUDOKI KABUSHIKI KAISHA, Iwata (JP)

(72) Inventors: Makoto Ito, Shizuoka (JP); Kohei Yamaguchi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 275 days.

(21) Appl. No.: 17/111,542

(22) Filed: Dec. 4, 2020

Related U.S. Application Data (60) Provisional application No. 62/953,710, filed on Dec. 26, 2019.

(51) Int. Cl.
| | |
|---|---|
| *G05D 1/00* | (2024.01) |
| *B63B 49/00* | (2006.01) |
| *B63H 25/00* | (2006.01) |
| *B63H 25/04* | (2006.01) |
| *B63H 25/02* | (2006.01) |

(52) U.S. Cl.
CPC ........... *G05D 1/0206* (2013.01); *B63B 49/00* (2013.01); *B63H 25/04* (2013.01); *B63H 2025/026* (2013.01)

(58) Field of Classification Search
CPC ...... G05D 1/0206; B63B 49/00; B63H 25/04; B63H 2025/026
USPC ........................................................... 701/21
See application file for complete search history.

(56) References Cited

U.S. PATENT DOCUMENTS

| | | | |
|---|---|---|---|
| 8,807,059 B1 * | 8/2014 | Samples | B63H 20/20 |
| | | | 114/144 R |
| 8,925,414 B1 * | 1/2015 | Park | B63H 21/213 |
| | | | 74/543 |
| 9,690,295 B1 * | 6/2017 | Abellera | G06F 17/00 |
| 10,377,458 B1 * | 8/2019 | McGinley | G05D 1/0206 |
| 2010/0128115 A1 * | 5/2010 | Nakano | G01B 11/03 |
| | | | 348/E7.085 |
| 2018/0244361 A1 * | 8/2018 | Laster | B63H 20/007 |

* cited by examiner

*Primary Examiner* — Tiffany P Young
(74) *Attorney, Agent, or Firm* — Keating & Bennett, LLP (57) ABSTRACT

A steering control system of a marine vessel includes a controller configured or programmed to perform a control to turn the marine vessel so as to change a target orientation in an automatic marine vessel maneuvering mode to hold a course in which the marine vessel is moved to the target orientation, and an operator to receive an operation to cause the controller to turn the marine vessel to the target orientation. The controller is configured or programmed to perform a control to increase a turning amount of the marine vessel according to an operation duration time in which a predetermined operation state of the operator continues.

19 Claims, 8 Drawing Sheets

STEERING CONTROL SYSTEM OF MARINE VESSEL, MARINE VESSEL AND STEERING CONTROL METHOD OF MARINE VESSEL

CROSS REFERENCE TO RELATED APPLICATIONS

This application claims the benefit of priority to U.S. Provisional Application No. 62/953,710 filed on Dec. 26, 2019. The entire contents of this application are hereby incorporated herein by reference.

BACKGROUND OF THE INVENTION

1. Field of the Invention

The present invention relates to a steering control system of a marine vessel, a marine vessel, and a steering control method of a marine vessel.

2. Description of the Related Art

A steering control system of a marine vessel that performs a control in an automatic marine vessel maneuvering mode during movement is known in general. Such a steering control system of a marine vessel is disclosed in U.S. Pat. No. 9,690,295, for example.

U.S. Pat. No. 9,690,295 discloses a steering control system including an autopilot apparatus that performs a control. This steering control system includes a control unit that performs a control to turn a marine vessel and a joystick that receives a rotation operation to turn the marine vessel. When the joystick is rotated in a clockwise direction (counterclockwise direction) from a reference position for predetermined rotation, the control unit performs a control to set a turning amount of a predetermined angle (10 degrees, for example) to the right (left) side and turn the marine vessel.

However, in the steering control system disclosed in U.S. Pat. No. 9,690,295, when the turning amount is further increased from the predetermined angle, it is necessary to return the joystick to the reference position for predetermined rotation and repeatedly rotate the joystick from the reference position. Thus, it is necessary to perform complex operations, and it is difficult to turn the marine vessel by an intuitive operation.

SUMMARY OF THE INVENTION

Preferred embodiments of the present invention provide steering control systems of marine vessels, marine vessels, and steering control methods of marine vessels that each improve the operability of the marine vessels by significantly reducing or preventing complex operations to turn the marine vessels and turn the marine vessels by intuitive operations.

According to a preferred embodiment of the present invention, a steering control system of a marine vessel includes a controller configured or programmed to perform a control to turn the marine vessel so as to change a target orientation in an automatic marine vessel maneuvering mode to hold a course in which the marine vessel is moved to the target orientation, and an operator to receive an operation to cause the controller to turn the marine vessel to the target orientation. The controller is configured or programmed to perform a control to increase a turning amount of the marine vessel according to an operation duration time in which a predetermined operation state of the operator continues.

In the steering control system of the marine vessel, as described above, the controller is configured or programmed to perform a control to increase the turning amount of the marine vessel according to the operation duration time in which the predetermined operation state of the operator continues in the automatic marine vessel maneuvering mode. Accordingly, the turning amount of the marine vessel is increased, and the marine vessel is turned simply by continuing the predetermined operation state of the operator without repeatedly operating the operator in order to increase the turning amount of the marine vessel, unlike the conventional case. Therefore, complex and repetitive operations as in the conventional case are not required, and thus the operability is improved by significantly reducing or preventing complex operations to turn the marine vessel. Furthermore, the marine vessel is turned by an intuitive operation.

In the steering control system of the marine vessel described above, the controller is preferably configured or programmed to perform a control to continue the automatic marine vessel maneuvering mode to hold the course even after the turning of the marine vessel in response to the control to turn the marine vessel in the automatic marine vessel maneuvering mode. Accordingly, the automatic marine vessel maneuvering mode to hold the course is continued even after the turning, and thus it is not necessary to set the automatic marine vessel maneuvering mode to hold the course again after the turning. Consequently, the operability of the marine vessel is further improved.

In the steering control system of the marine vessel described above, the controller is preferably configured or programmed to perform a control to increase the turning amount by a first angular amount in a stepwise manner every fixed period of time when the predetermined operation state of the operator continues. Accordingly, the turning amount is increased by the first angular amount in a stepwise manner every fixed period of time that the operator is operated, and thus the marine vessel is turned such that an increase in the turning amount is linked to the user's sense of time. Therefore, the marine vessel is turned by a more intuitive operation.

In such a case, the controller is preferably configured or programmed to perform a control to increase the turning amount by a second angular amount smaller than the first angular amount when the predetermined operation state of the operator is ended within a time shorter than the fixed period of time. Accordingly, the turning amount is finely adjusted by the second angular amount in a range smaller than the first angular amount.

In the structure including the controller configured or programmed to perform a control to increase the turning amount by the second angular amount smaller than the first angular amount, the first angular amount is preferably 5 degrees or more, and the second angular amount is preferably less than 5 degrees. Accordingly, the turning amount is roughly set by a relatively large first angular amount of 5 degrees or more, and the turning amount is finely adjusted by a relatively small second angular amount of less than 5 degrees.

In the steering control system of the marine vessel described above, the turning amount of the marine vessel is preferably less than 180 degrees. Accordingly, the marine vessel is prevented from rotationally turning half a turn or more.

In the steering control system of the marine vessel described above, the operator preferably includes a joystick that is able to be rotatably operated and tiltably operated, and the controller is preferably configured or programmed to perform a control to increase the turning amount in a stepwise manner according to the operation duration time in which a rotated state of the joystick rotated in a predetermined direction from a reference position continues. Accordingly, the turning amount is increased in a stepwise manner simply by rotating the joystick, and thus the operability is further improved by significantly reducing or preventing complex operations to turn the marine vessel. Furthermore, the marine vessel is turned by a more intuitive operation.

In such a case, the controller is preferably configured or programmed to perform a control to offset a course of the marine vessel to a left side and a right side based on a leftward tilting operation and a rightward tilting operation on the joystick, respectively, in the automatic marine vessel maneuvering mode. Accordingly, not only the function of receiving an operation to turn the marine vessel but also the function of receiving an operation to offset the marine vessel is integrated in the joystick, and thus the operability of the marine vessel by the joystick is improved.

In the structure including the controller configured or programmed to perform a control to offset the course of the marine vessel to the left side and the right side, the controller is preferably configured or programmed to perform a control to increase an offset amount in a stepwise manner each time the joystick is repeatedly tilted to one of the left side and the right side. Accordingly, the course of the marine vessel is offset simply by tilting the joystick, and the offset amount is increased in a stepwise manner simply by repeating the tilting operation. Thus, the marine vessel is easily offset by the joystick.

In the structure including the controller configured or programmed to perform a control to offset the course of the marine vessel to the left side and the right side, the controller is preferably configured or programmed to perform a control to cancel an offset of the marine vessel when the joystick is tilted to one of the left side and the right side after the joystick is tilted to the other of the left side and the right side and before the offset of the marine vessel is completed. Accordingly, the offset of the marine vessel is canceled by the joystick before the offset of the marine vessel is completed, and thus the course is corrected at an early stage without waiting for the completion of the offset of the marine vessel.

In the structure including the controller configured or programmed to perform a control to offset the course of the marine vessel to the left side and the right side, the controller is preferably configured or programmed to perform a control to cancel an offset amount by one of the leftward tilting operation and the rightward tilting operation performed again on the joystick, set a predetermined offset amount in a same direction as an offset direction before cancellation of the offset amount from a position of the marine vessel at a time of the tilting operation performed again, and offset the marine vessel again when a predetermined period of time elapses from receiving the tilting operation after one of the leftward tilting operation and the rightward tilting operation on the joystick is performed and before an offset of the marine vessel is completed. Accordingly, the offset is canceled substantially at the same time as resetting the predetermined offset amount by a single operation, and thus the operability of the marine vessel is improved.

In the structure including the controller configured or programmed to perform a control to offset the course of the marine vessel to the left side and the right side, the controller is preferably configured or programmed to perform a control to cancel an offset of the marine vessel and turn the marine vessel when the joystick is rotated after the joystick is tilted to one of the left side and the right side and before the offset of the marine vessel is completed. Accordingly, the offset of the marine vessel is canceled substantially at the same time as the control to turn the marine vessel by a single operation, and thus the operability of the marine vessel is improved. In addition, the marine vessel is immediately shifted from offset to turning.

In the structure including the controller configured or programmed to perform a control to increase the turning amount in a stepwise manner according to the operation duration time of the joystick, the controller is preferably configured or programmed to perform a control to offset a course of the marine vessel to a left side and a right side based on a leftward tilting operation and a rightward tilting operation on the joystick, respectively, in the automatic marine vessel maneuvering mode, and to perform a control to cancel turning of the marine vessel and offset the marine vessel when the joystick is tilted to the left side or the right side after the joystick is rotated and before the turning of the marine vessel is completed. Accordingly, the turning of the marine vessel is canceled substantially at the same time as the control to offset the marine vessel by a single operation, and thus the operability of the marine vessel is improved. In addition, the marine vessel is immediately shifted from turning to being offset.

In the structure including the controller configured or programmed to perform a control to increase the turning amount in a stepwise manner according to the operation duration time of the joystick, the controller is preferably configured or programmed to perform a control to change a speed of the marine vessel based on a forward tilting operation and a rearward tilting operation on the joystick in the automatic marine vessel maneuvering mode. Accordingly, not only the function of receiving an operation to turn the marine vessel but also the function of receiving an operation to change the speed of the marine vessel is integrated in the joystick, and thus the operability of the marine vessel by the joystick is improved.

In the steering control system of the marine vessel described above, the operator preferably includes a pressable switch, and the controller is preferably configured or programmed to perform a control to increase the turning amount in a stepwise manner according to the operation duration time in which a pressed state of the switch continues. Accordingly, the turning amount is increased in a stepwise manner simply by pressing the switch, and thus the marine vessel is turned by a more intuitive operation.

The steering control system of the marine vessel described above preferably further includes a display to schematically display the marine vessel, the target orientation of the marine vessel, and a course of the marine vessel in the automatic marine vessel maneuvering mode. Accordingly, the movement state of the marine vessel is easily understood by the user in the automatic marine vessel maneuvering mode via the display.

A marine vessel according to a preferred embodiment of the present invention includes a hull, a controller configured or programmed to perform a control to turn the hull so as to change a target orientation in an automatic marine vessel maneuvering mode to hold a course in which the hull is moved to the target orientation, and an operator to receive an operation to cause the controller to turn the hull to the target orientation. The controller is configured or programmed to perform a control to increase a turning amount of the hull according to an operation duration time in which a predetermined operation state of the operator continues.

The operability of the marine vessel described above is improved by significantly reducing or preventing complex operations to turn the marine vessel, and the marine vessel is turned by an intuitive operation, similarly to the steering control system of the marine vessel described above.

In the marine vessel described above, the controller is preferably configured or programmed to perform a control to continue the automatic marine vessel maneuvering mode to hold the course even after the turning of the hull in response to the control to turn the hull in the automatic marine vessel maneuvering mode. Accordingly, the automatic marine vessel maneuvering mode to hold the course is continued even after the turning, and thus it is not necessary to set the automatic marine vessel maneuvering mode to hold the course again after the turning. Consequently, the operability of the marine vessel is further improved.

A steering control method of a marine vessel according to a preferred embodiment of the present invention includes turning the marine vessel so as to change a target orientation in an automatic marine vessel maneuvering mode to hold a course in which the marine vessel is moved to the target orientation, and increasing a turning amount of the marine vessel in a stepwise manner based on a predetermined operation state of an operator continuing during a control in the automatic marine vessel maneuvering mode.

The steering control method of the marine vessel described above improves the operability by significantly reducing or preventing complex operations to turn the marine vessel, and the marine vessel is turned by an intuitive operation, similarly to the steering control system of the marine vessel described above.

In the steering control method of the marine vessel described above, the turning of the marine vessel so as to change the target orientation in the automatic marine vessel maneuvering mode preferably includes continuing the automatic marine vessel maneuvering mode to hold the course even after the turning of the marine vessel. Accordingly, the automatic marine vessel maneuvering mode to hold the course is continued even after the turning, and thus it is not necessary to set the automatic marine vessel maneuvering mode to hold the course again after the turning. Consequently, the operability of the marine vessel is further improved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention are hereinafter described with reference to the drawings.

The structure of a marine vessel 100 according to preferred embodiments of the present invention is now described with reference to FIGS. 1 to 13. In the figures, arrow FWD represents the forward movement direction of the marine vessel 100, and arrow BWD represents the reverse movement direction of the marine vessel 100. In addition, arrow L represents the left side of the marine vessel 100, and arrow R represents the right side of the marine vessel 100.

Figure 1:
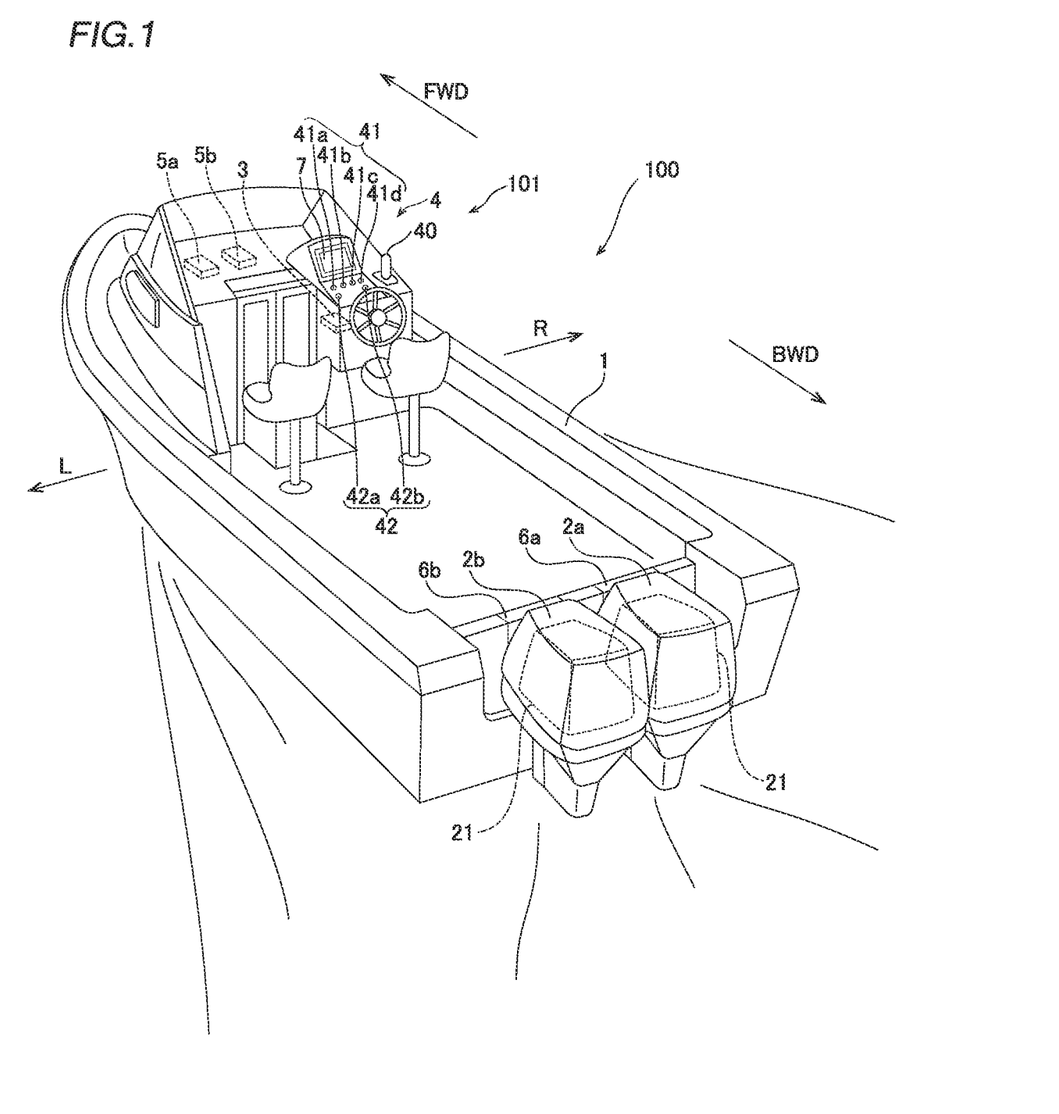
FIG. 1 is a perspective view schematically showing a marine vessel including outboard motors according to a preferred embodiment of the present invention.

As shown in FIG. 1, the marine vessel 100 includes a hull 1, outboard motors 2a and 2b attached to the hull 1, and a steering control system 101.

The marine vessel 100 is preferably an outboard motor boat including the outboard motors 2a and 2b. The outboard motors 2a and 2b are attached to the rear of the hull 1. The outboard motors 2a and 2b have the same or similar structure. Therefore, the outboard motor 2a is mainly described below.

Figure 2:
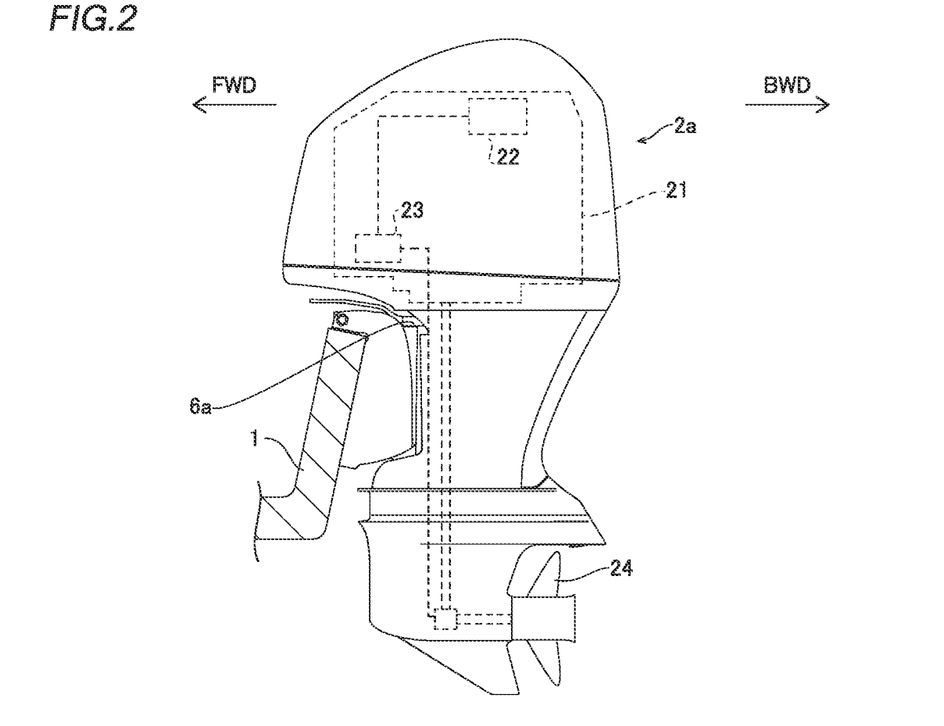
FIG. 2 is a side view illustrating the structure of an outboard motor according to a preferred embodiment of the present invention.

As shown in FIG. 2, the outboard motor 2a includes an engine 21, an engine control unit (ECU) 22, a shift actuator 23, and a propeller 24.

The engine 21 is preferably an internal combustion engine that generates a driving force by combustion of fuel. The engine 21 rotates a crankshaft (not shown) by the generated driving force. When the crankshaft is rotated, the propeller 24 of the outboard motor 2a is rotated. A propulsive force P (see FIG. 5) is generated by the rotation of the propeller 24, and the hull 1 moves. The shift actuator 23 moves the shift position of the outboard motor 2a to any one of a forward movement position (F), a neutral position (N), and a reverse movement position (R) based on an operation performed on an operation lever (not shown). Thus, when the engine 21 is being driven and the shift position of the outboard motor 2a is at the forward movement position (F), the hull 1 moves forward. When the engine 21 is being driven and the shift position of the outboard motor 2a is at the reverse movement position (R), the hull 1 moves rearward. When the engine 21 is being driven and the shift position of the outboard motor 2a is at the neutral position (N), no propulsive force P is generated for the hull 1.

The ECU 22 controls driving of the engine 21 and driving of the shift actuator 23 based on a command from the steering control system 101. For example, the ECU 22 performs each control process by executing a program stored in a memory.

Figure 3:
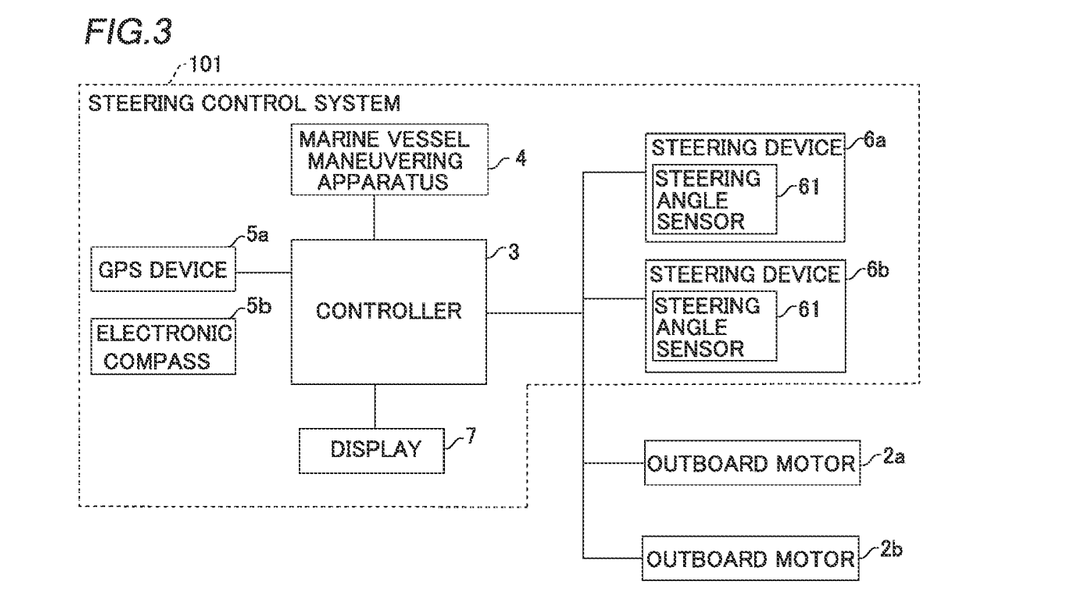
FIG. 3 is a block diagram showing the structure of a steering control system according to a preferred embodiment of the present invention.

As shown in FIG. 3, the steering control system 101 includes a controller 3, a marine vessel maneuvering apparatus 4, a global positioning system (GPS) device 5a, an electronic compass 5b, steering devices 6a and 6b, and a display 7.

The GPS device 5a transmits detected current position information and speed information about the marine vessel 100 (hull 1) to the controller 3 and the display 7. The electronic compass 5b transmits detected current orientation information about the marine vessel 100 (hull 1) to the controller 3 and the display 7.

The controller 3 includes a control circuit including a central processing unit (CPU), for example. The controller 3 is configured or programmed to perform a control to steer (turn) or offset the marine vessel 100 and a control to change the propulsive forces P of the outboard motors 2a and 2b in an automatic marine vessel maneuvering mode during movement. The controller 3 may be configured or programmed to perform each control process by executing a program (software) stored in the memory (not shown), or may be configured or programmed to perform a control process as hardware (circuit structure).

Figure 4:
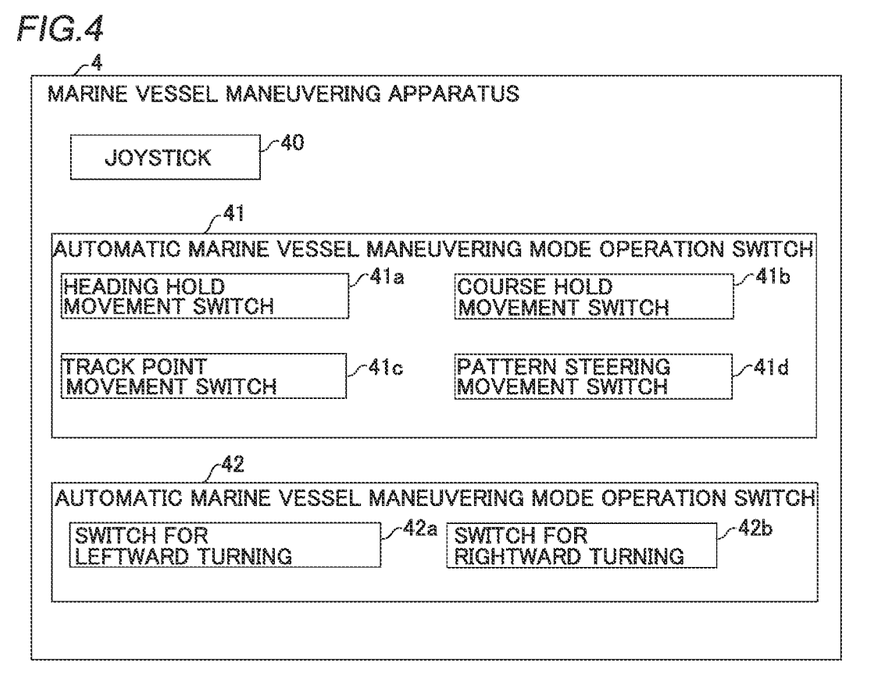
FIG. 4 is a block diagram showing the structure of a marine vessel maneuvering apparatus according to a preferred embodiment of the present invention.

The marine vessel maneuvering apparatus 4 shown in FIG. 4 transmits an operation signal to the controller 3 to operate the controller 3. The marine vessel maneuvering apparatus 4 includes a joystick 40, an automatic marine vessel maneuvering mode operation switch 41, and a switch 42 to turn the marine vessel 100. The joystick 40 and the switch 42 to turn are examples of an "operator".

Figure 5:
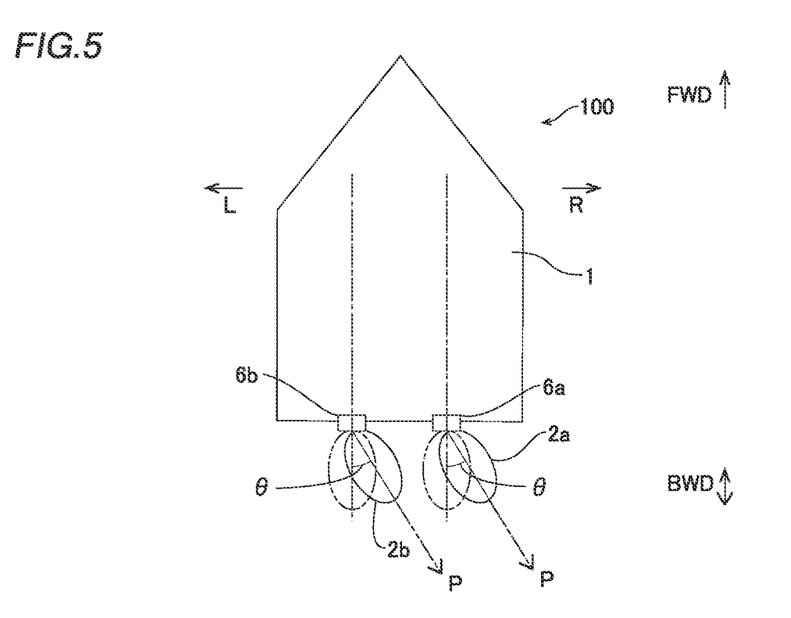
FIG. 5 is a schematic view illustrating the steering angle of a marine vessel according to a preferred embodiment of the present invention.

As shown in FIG. 5, the joystick 40 provides information about the steering angles θ of the steering devices 6a and 6b that steer the marine vessel 100 via the controller 3. That is, the joystick 40 is a device that generates a signal to control movement of the marine vessel 100 (hull 1) based on the user's operation. Specifically, the joystick 40 receives an operation such that the controller 3 turns the marine vessel 100 to a target orientation in the automatic marine vessel maneuvering mode to hold a course in which the marine vessel 100 is moved to the target orientation. Furthermore, the joystick 40 receives an operation to offset the marine vessel 100 (hull 1) to the left or right side when the marine vessel 100 is being moved to the target orientation by the controller 3 in the automatic marine vessel maneuvering mode to hold a course. The details are described below.

Figure 6:
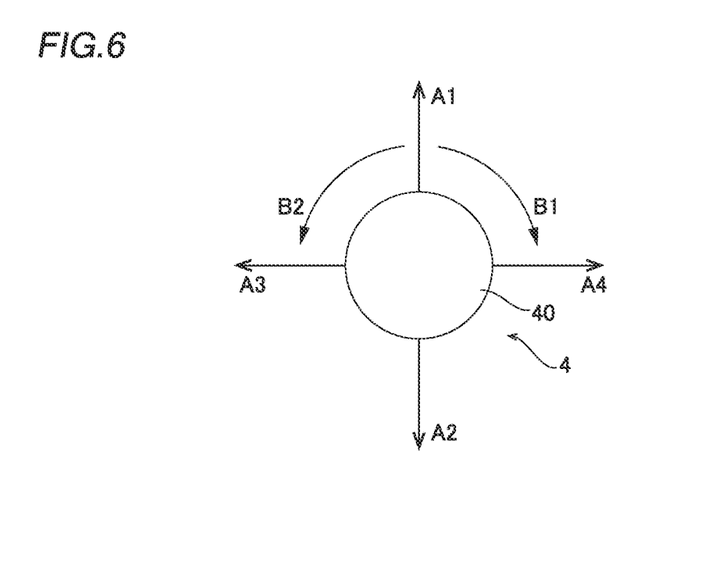
FIG. 6 is a schematic view illustrating the structure of a joystick according to a preferred embodiment of the present invention.

The joystick 40 shown in FIG. 6 has a columnar shape. The joystick 40 is rotatably operated. Specifically, the joystick 40 is rotatably operated in a clockwise direction B1 from a reference position and is rotatably operated in a counterclockwise direction B2 from the reference position. When the joystick 40 is rotated in the clockwise direction B1 from the reference position, the marine vessel 100 (hull 1) is turned to the right side in principle. When the joystick 40 is rotated in the counterclockwise direction B2 from the reference position, the marine vessel 100 (hull 1) is turned to the left side in principle. When a rotation operation in a predetermined direction by the user is released, the joystick 40 is rotated in a direction opposite to a direction of rotation by the user by a built-in urging member to return to the reference position. The joystick 40 is rotated when the marine vessel 100 (hull 1) is turned.

The joystick 40 is tiltably operated to the left side A3 and the right side A4. Specifically, the joystick 40 is tiltably operated to the left side A3 from a reference position and is tiltably operated to the right side A4 from the reference position. When a tilting operation by the user is released, the joystick 40 is moved in a direction opposite to a direction of tilting by the user by the built-in urging member to return to the reference position. The joystick 40 is tilted to the left side A3 and the right side A4 to offset the marine vessel 100 (hull 1).

The joystick 40 may be tiltably operated to the front A1 and the rear A2. Specifically, the joystick 40 is tiltably operated to the front A1 from the reference position and is tiltably operated to the rear A2 from the reference position. When a tilting operation by the user is released, the joystick 40 is moved in a direction opposite to a direction of tilting by the user by the built-in urging member to return to the reference position. The joystick 40 is tilted to the front A1 and the rear A2 to change the speed of the marine vessel 100 (hull 1).

The joystick 40 transmits the turning amount and the offset amount to the controller 3 based on the user's operation. The controller 3 is configured or programmed to drive the steering devices 6a and 6b and the outboard motors 2a and 2b based on the turning amount and the offset amount.

The automatic marine vessel maneuvering mode operation switch 41 shown in FIG. 4 transmits a command signal to start the automatic marine vessel maneuvering mode (autopilot mode) to the controller 3 when operated by an operator. Specifically, the automatic marine vessel maneuvering mode operation switch 41 includes four switches including a heading hold movement switch 41a, a course hold movement switch 41b, a track point movement switch 41c, and a pattern steering movement switch 41d.

The controller 3 performs a heading hold control to move the hull 1 while holding the orientation of the hull 1 in the automatic marine vessel maneuvering mode when the heading hold movement switch 41a is operated (pressed, for example).

The controller 3 performs a course hold control to move the hull 1 while holding the course of the hull 1 in the automatic marine vessel maneuvering mode when the course hold movement switch 41b is operated (pressed, for example). In preferred embodiments of the present invention, a turning operation via the joystick 40 (switch 42 for turning) is performed when the course hold control is being performed. Furthermore, an offset operation via the joystick 40 is performed when the course hold control is being performed.

The controller 3 performs a track point control to move the hull 1 such that the hull 1 passes through a target passing point in the automatic marine vessel maneuvering mode when the track point movement switch 41c is operated (pressed, for example).

The controller 3 performs a pattern steering control to move the hull 1 on a predetermined course pattern in the automatic marine vessel maneuvering mode when the pattern steering movement switch 41d is operated (pressed, for example).

The switch 42 for turning includes two switches including a switch 42a for leftward turning and a switch 42b for rightward turning.

The switch 42a for leftward turning includes a function of generating the same signal as a signal generated during a rotation operation to rotate the joystick 40 in the counterclockwise direction. That is, the switch 42a for leftward turning is pressed to turn the marine vessel 100 (hull 1) to the left side when the automatic marine vessel maneuvering mode (course hold control) to hold a course is being executed.

The switch 42b for rightward turning includes a function of generating the same signal as a signal generated during a rotation operation to rotate the joystick 40 in the clockwise direction. That is, the switch 42b for rightward turning is pressed to turn the marine vessel 100 (hull 1) to the right side when the automatic marine vessel maneuvering mode (course hold control) to hold a course is being executed.

As shown in FIG. 3, the steering devices 6a and 6b change the orientation of the outboard motor 2a with respect to the hull 1 under the control of the controller 3. The steering device 6a turns or offsets the marine vessel 100 (hull 1) by changing the orientation of the outboard motor 2a. Furthermore, each of the steering devices 6a and 6b includes a steering angle sensor 61. The steering angle sensor 61 detects the current steering angle and transmits the detected current steering angle to the controller 3.

Figure 7:
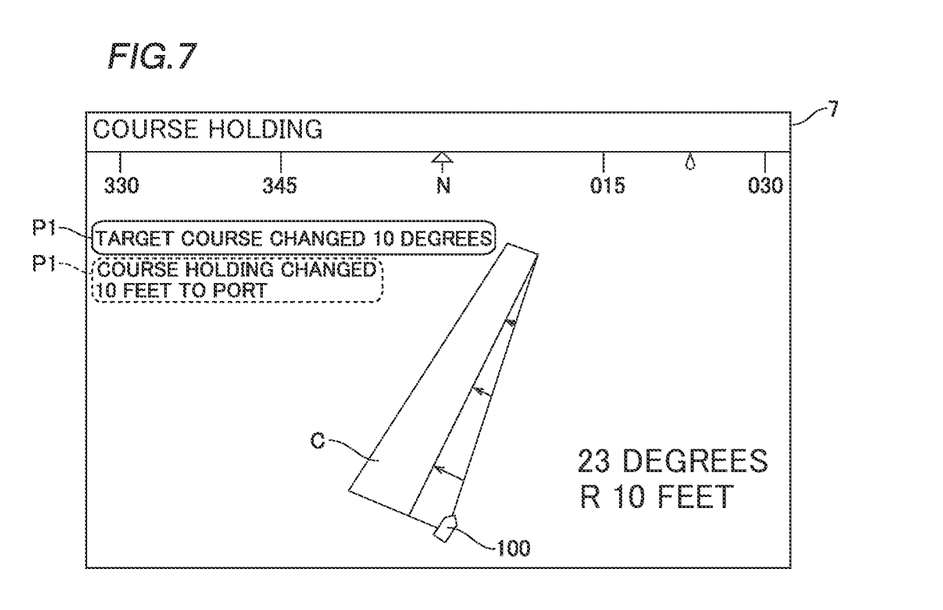
FIG. 7 is a schematic view illustrating a display example of a display according to a preferred embodiment of the present invention.

The display 7 shown in FIG. 7 schematically displays the marine vessel 100, the target orientation of the marine vessel 100, and the course of the marine vessel 100 in the automatic marine vessel maneuvering mode (course hold control) to hold a course. For example, the display 7 displays the schematic marine vessel 100 at a lower portion of a display screen and displays a course C that extends upward from the schematic marine vessel 100 in the display screen. The display 7 displays the target orientation (east, west, north, south, etc.) of the marine vessel 100 at the upper portion of the display screen. Furthermore, the display 7 schematically displays the predicted course of the marine vessel 100 (hull 1) at the time of turning or offset. The display 7 may display the marine vessel 100 and the course C in a manner shown in FIGS. 8 to 11.

The display 7 displays a pop-up P1 at the time of turning (at the time of changing the orientation) when a turning operation (rotation operation) is performed on the joystick 40 to change the course. For example, the display 7 displays "Target Course Changed 10 degrees" at the time of turning. Furthermore, the display 7 displays the remaining turning amount (the remaining turning amount of 10 degrees or less) until the turning is completed.

The display 7 displays a pop-up P1 at the time of offset when an offset operation (leftward or rightward tilting operation) is performed on the joystick 40 to change the course. For example, the display 7 displays "COURSE HOLDING CHANGED 10 FEET TO PORT" at the time of offset. Furthermore, the display 7 displays the remaining offset amount (the remaining offset amount of 10 feet or less) until the offset is completed.

The controller 3 shown in FIG. 1 performs a control to turn the marine vessel 100 so as to change the target orientation based on a rotation operation on the joystick 40 in the automatic marine vessel maneuvering mode to hold a course in which the marine vessel 100 (hull 1) is moved to the target orientation. When performing a control to turn the marine vessel 100 in the automatic marine vessel maneuvering mode to hold a course, the controller 3 performs a control to continue the automatic marine vessel maneuvering mode to hold a course even after the turning. Furthermore, the switch 42 is operated in the same manner as the joystick 40. That is, when the pressed state of the switch 42 continues, the controller 3 performs a control to increase the turning amount in a stepwise manner according to the operation duration time (pressing duration time).

The controller 3 performs a control to offset the marine vessel 100 to the left side and the right side based on a leftward tilting operation and a rightward tilting operation on the joystick 40, respectively, in the automatic marine vessel maneuvering mode to hold a course in which the marine vessel 100 (hull 1) is moved to the target orientation. When performing a control to offset the marine vessel 100 in the automatic marine vessel maneuvering mode to hold a course, the controller 3 performs a control to continue the automatic marine vessel maneuvering mode to hold a course even after the offset.

The controller 3 performs a control to change the speed of the marine vessel 100 based on forward and rearward tilting operations on the joystick 40 in the automatic marine vessel maneuvering mode. For example, the controller 3 performs a control to increase the speed of the marine vessel 100 based on a forward tilting operation on the joystick 40, and performs a control to decrease the speed of the marine vessel 100 based on a rearward tilting operation on the joystick 40. In this case, an increase/decrease in the speed is adjusted according to the tilting amount.

Structures of a control to turn the marine vessel 100 and a control to offset the marine vessel 100 are now described in order.

Figure 8:
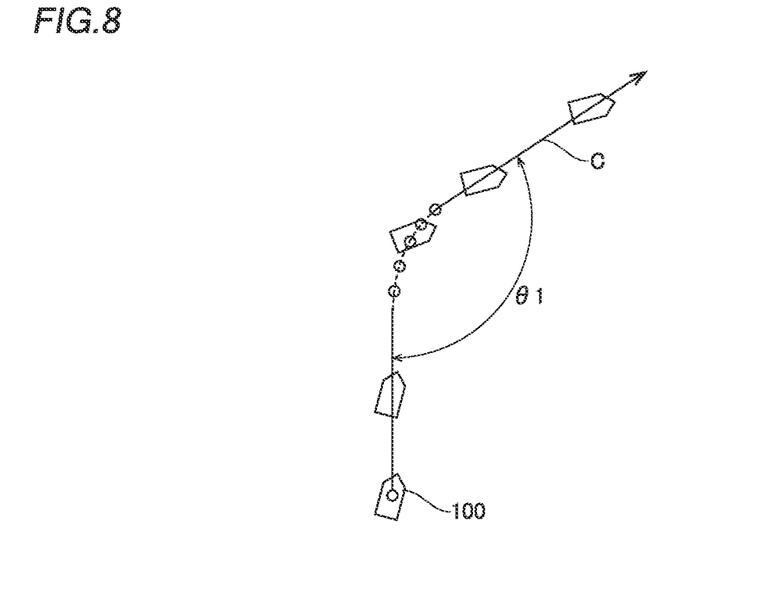
FIG. 8 is a schematic view illustrating turning of a marine vessel according to a preferred embodiment of the present invention.

As shown in FIG. 8, when the predetermined operation state of the joystick 40 continues, the controller 3 performs a control to increase the turning amount $\theta 1$ of the marine vessel 100 according to the operation duration time.

The predetermined operation state refers to an operation state of rotation performed on the joystick 40 described above. Specifically, the predetermined operation state refers to the rotated state of the joystick 40 rotated in the clockwise direction B1 (see FIG. 6) from the reference position or the rotated state of the joystick 40 rotated in the counterclockwise direction B2 (see FIG. 6) from the reference position. This is a rotation operation for rotating in the clockwise direction B2 (see FIG. 6).

The operation duration time refers to a unit time required to increase the turning amount $\theta 1$ of the marine vessel 100. For example, the operation duration time is set to N seconds (0.75 seconds, for example), and when N seconds (0.75 seconds) have elapsed while the joystick 40 is kept rotated, the turning amount $\theta 1$ is set to a larger value. When N seconds (0.75 seconds) have elapsed thereafter, the turning amount $\theta 1$ is set to a still larger value. That is, when the joystick 40 is continued to be rotated, the controller 3 updates the turning amount $\theta 1$ so as to increase the turning amount $\theta 1$ every N seconds.

In the control described above (control to increase the turning amount $\theta 1$ of the marine vessel 100 according to the operation duration time), the controller 3 performs a control to increase the turning amount $\theta 1$ by a first angular amount in a stepwise manner every fixed period of time (N seconds) when the predetermined operation state (the rotated state in the clockwise direction or the counterclockwise direction) of the joystick 40 continues. Therefore, the controller 3 is configured or programmed to increase the turning amount $\theta 1$ in a stepwise manner by holding a state in which the joystick 40 has been rotated in the clockwise (counterclockwise) direction without returning the joystick 40 to the reference position from a state in which the joystick 40 has been rotated in the clockwise (counterclockwise) direction.

The first angular amount refers to a unit increase amount of an angle at the time of increasing the turning amount θ1 of the marine vessel 100. For example, the first angular amount is 5 degrees or more. As a more detailed example, the first angular amount is 5 degrees. The turning amount θ1 of the marine vessel 100 is at most less than 180 degrees. As a more detailed example, the leftward and rightward turning amounts θ1 of the marine vessel 100 are at most 150 degrees.

In the control described above (control to increase the turning amount θ1 of the marine vessel 100 according to the operation duration time), the controller 3 performs a control to increase the turning amount θ1 by a second angular amount smaller than the first angular amount when the predetermined operation state of the operator is ended within a time shorter than the fixed period of time. Therefore, the controller 3 is configured or programmed to finely adjust the turning amount θ1 by the second angular amount smaller than the first angular amount.

The second angular amount refers to a unit increase amount of an angle at the time of increasing the turning amount θ1 of the marine vessel 100. For example, the second angular amount is less than 5 degrees. As a more detailed example, the second angular amount is 1 degree, for example.

Figure 9:
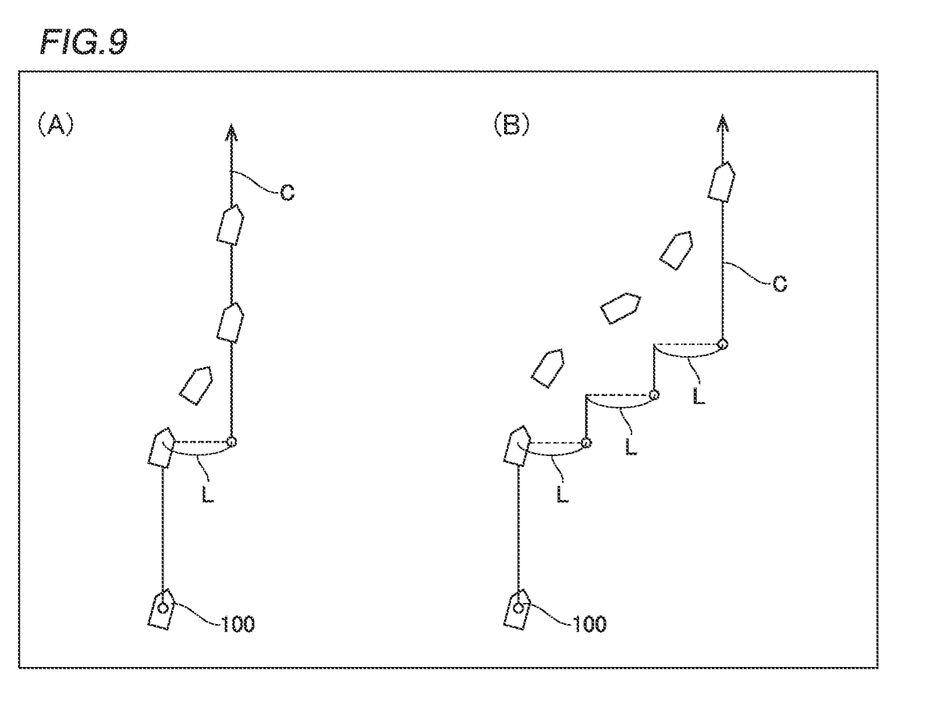
FIG. 9 is a schematic view illustrating offset of a marine vessel according to a preferred embodiment of the present invention.

As shown in (A) and (B) in FIG. 9, the controller 3 performs a control to increase the offset amount in a stepwise manner each time the joystick 40 is repeatedly tilted to one of the left side and the right side.

For example, suppose that the offset amount obtained when the joystick 40 is tilted to the left (right) side once is L feet (10 feet, for example). In such a case, the controller 3 performs a control to increase the offset amount by L feet (10 feet, for example) in a stepwise manner each time the joystick 40 is repeatedly tilted to the left (right) side. An offset direction (a direction in which the course C is translated) is the same as the tilting direction of the joystick 40.

The controller 3 is able to cancel the offset of the marine vessel 100 based on an operation on the joystick 40 after either a leftward tilting operation or a rightward tilting operation on the joystick 40. There are the following three controls (modes) of the controller 3 to cancel the offset of the marine vessel 100. They are described below in order.

Figure 10:
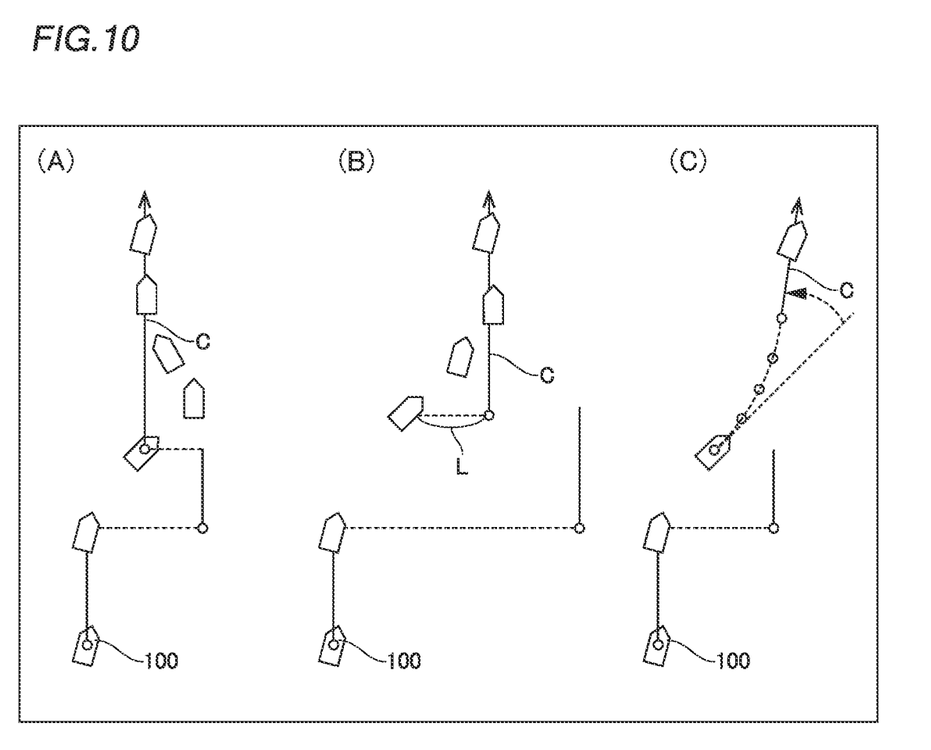
FIG. 10 is a schematic view illustrating cancellation of offset of a marine vessel according to a preferred embodiment of the present invention.

As shown in (A) of FIG. 10, as a control to cancel a first offset, the controller 3 performs a control to cancel the offset of the marine vessel 100 when the joystick 40 is tilted to one of the left side and the right side after the joystick 40 is tilted to the other of the left side and the right side and before the offset of the marine vessel 100 is completed.

As a specific example, the controller 3 performs a control to cancel the offset of the marine vessel 100, set a target orientation (course C) parallel to the target orientation before the offset at a position at which the offset of the marine vessel 100 is canceled (a position at which the joystick 40 has been tilted to the left side), and continue movement in the automatic marine vessel maneuvering mode to hold a course when the joystick 40 is tilted to the left side after the joystick 40 is tilted to the right side and before the offset of the marine vessel 100 is completed.

As shown in (B) in FIG. 10, as a control to cancel a second offset, the controller 3 performs a control to cancel the offset amount by one of a leftward tilting operation and a rightward tilting operation performed again on the joystick 40, set a predetermined offset amount in the same direction as the offset direction before the cancellation from the position of the marine vessel 100 at the time of the tilting operation performed again, and offset the marine vessel 100 again when a predetermined period of time elapses from receiving one of a leftward tilting operation and a rightward tilting operation on the joystick 40 after one of the leftward tilting operation and the rightward tilting operation on the joystick 40 is performed and before the offset of the marine vessel 100 is completed. The predetermined period of time is 3 seconds, for example.

As a specific example, the controller 3 performs a control to cancel the offset amount by a rightward tilting operation performed again on the joystick 40, set the predetermined offset amount in a right direction from the position of the marine vessel 100 at the time of the tilting operation performed again, and offset the marine vessel 100 again when the predetermined period of time (3 seconds, for example) elapses from receiving the tilting operation after the rightward tilting operation on the joystick 40 is performed and before the offset of the marine vessel 100 is completed.

As shown in (C) in FIG. 10, as a control to cancel a third offset, the controller 3 performs a control to cancel the offset of the marine vessel 100 and turn the marine vessel 100 when the joystick 40 is rotated after the joystick 40 is tilted to either the left side or the right side and before the offset of the marine vessel 100 is completed. At this time, a reference direction at the start of the turning of the marine vessel 100 is determined based on the orientation (traveling direction) of the marine vessel 100 at the time at which the joystick 40 is rotated before the offset of the marine vessel 100 is completed.

Figure 11:
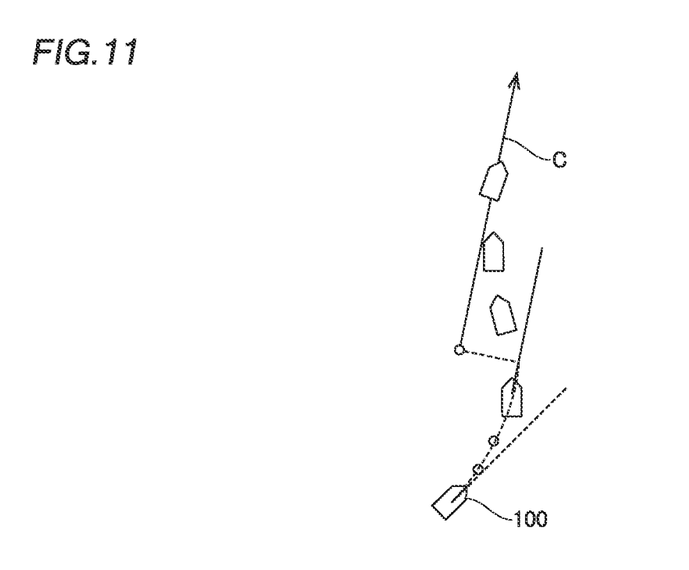
FIG. 11 is a schematic view illustrating cancellation of turning of a marine vessel according to a preferred embodiment of the present invention.

As shown in FIG. 11, the controller 3 is able to perform a control to cancel the turning at the time of the turning and offset of the marine vessel 100. Specifically, the controller 3 performs a control to cancel turning of the marine vessel 100 and offset of the marine vessel 100 when the joystick 40 is tilted to the left side or the right side after the joystick 40 is rotated and before the turning of the marine vessel 100 is completed in the automatic marine vessel maneuvering mode to hold a course. At this time, a reference direction at the start of the offset of the marine vessel 100 is determined based on the orientation (traveling direction) of the marine vessel 100 at the time at which the joystick 40 is tilted before the turning of the marine vessel 100 is completed.

Figure 12:
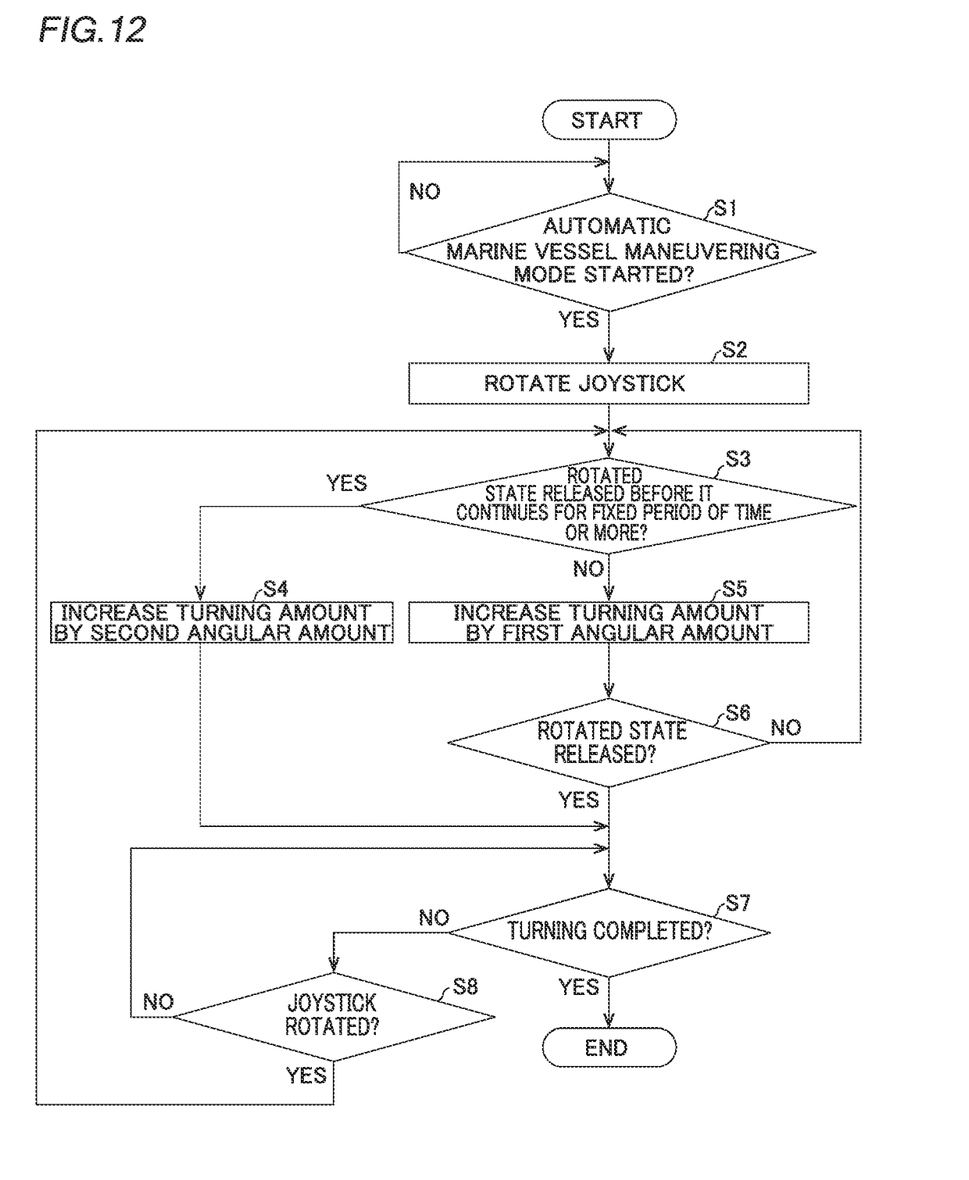
FIG. 12 is a flowchart illustrating a steering control method to turn a marine vessel according to a preferred embodiment of the present invention.

A steering control method of the marine vessel 100 according to preferred embodiments of the present invention is now described with reference to FIG. 12. FIG. 12 shows a flowchart of a turning control process of the steering control system 101. The following various controls are performed by the controller 3.

In step S1, it is determined whether or not an operation to start the automatic marine vessel maneuvering mode to hold a course has been received. When the operation to start the automatic marine vessel maneuvering mode is received, the process advances to step S2. This determination is repeated until the operation to start the automatic marine vessel maneuvering mode is received.

In step S2, the joystick 40 is rotated in the clockwise direction or the counterclockwise direction.

In step S3, it is determined whether or not the rotated state of the joystick 40 in step S2 has been released before it continues for the fixed period of time (N seconds) or more. As a specific example, in step S3, it is determined whether or not the rotated state in step S2 has been released before it continues for 0.75 seconds or more. Then, when the rotated state in step S2 has been released before it continues for 0.75 seconds or more, the process advances to step S4.

When the rotated state in step S2 has been not released before it continues for 0.75 seconds or more, the process advances to step S5.

In step S4, the turning amount is increased by the second angular amount. As a specific example, the turning amount is increased by 1 degree. Then, the process advances to step S7. When the process advances to step S4 via step S5, step S6, and step S3, the process advances to step S7 without increasing the turning amount.

In step S5, the turning amount is increased by the first angular amount. As a specific example, the turning amount is increased by 5 degrees. Then, the process advances to step S6.

In step S6, it is determined whether or not the rotated state of the joystick 40 has been released. When the rotated state has not been released, the process returns to step S3, and when the rotated state has been released, the process advances to step S7.

In step S7, it is determined whether or not turning of the marine vessel 100 is completed. When turning of the marine vessel 100 is completed, the turning control process is terminated. When turning of the marine vessel 100 is not completed, the process advances to step S8.

In step S8, it is determined whether or not the joystick 40 has been rotated again. When the joystick 40 has been rotated again, the process returns to step S3. When the joystick 40 has not been rotated again, the process returns to step S7. When the turning control process is performed and the turning described above is canceled, the turning control process is terminated immediately.

Figure 13:
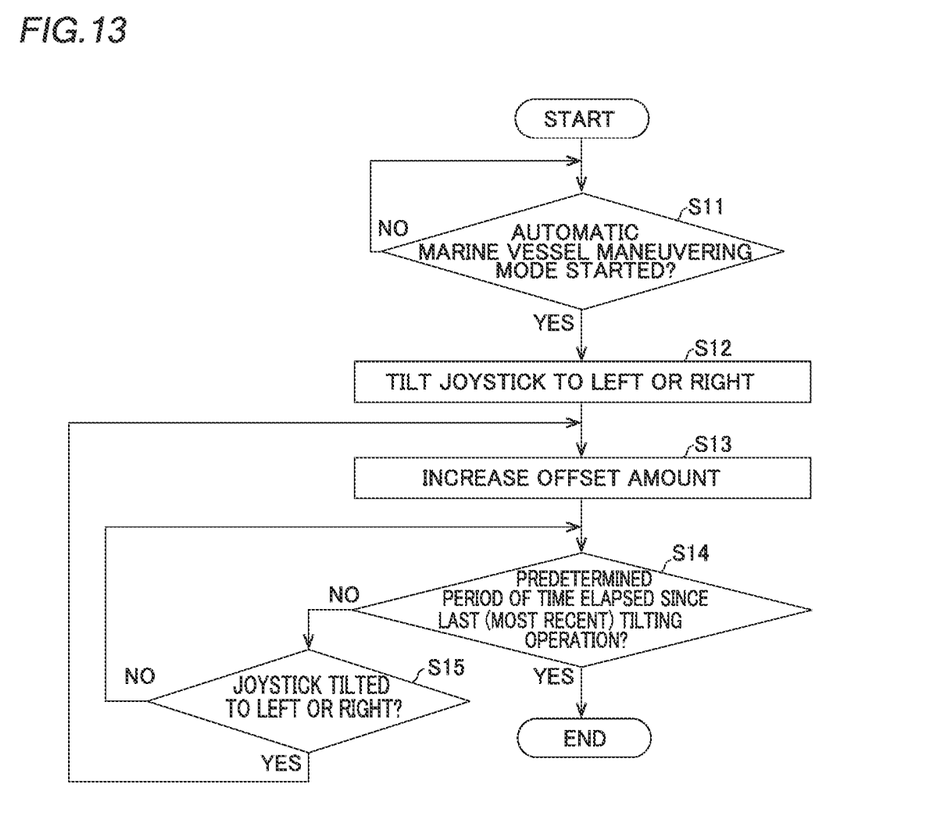
FIG. 13 is a flowchart illustrating a steering control method to offset a marine vessel according to a preferred embodiment of the present invention.

A steering control method of the marine vessel 100 according to preferred embodiments of the present invention is now described with reference to FIG. 13. FIG. 13 shows a flowchart of an offset control process of the steering control system 101. The following various controls are performed by the controller 3.

In step S11, it is determined whether or not an operation to start the automatic marine vessel maneuvering mode to hold a course has been received. When the operation to start the automatic marine vessel maneuvering mode has been received, the process advances to step S12. This determination is repeated until the operation to start the automatic marine vessel maneuvering mode is received.

In step S12, the joystick 40 is tilted to the left or right side.

In step S13, the predetermined offset amount is increased.

In step S14, it is determined whether or not the predetermined period of time has elapsed since the last (most recent) tilting operation. As a specific example, it is determined whether or not 3 seconds have elapsed since the last (most recent) tilting operation. Thus, the offset amount is fixed, and the offset control process is terminated. Furthermore, in step S14, when the predetermined period of time has not elapsed since the last (most recent) tilting operation, the process advances to step S15.

In step S15, it is determined whether or not the joystick 40 has been tilted again. When the joystick 40 has been tilted again, the process returns to step S13. When the joystick 40 has not been tilted again, the process returns to step S14. When the offset control process is performed and the offset described above is canceled, the offset control process is terminated immediately.

According to the various preferred embodiments of the present invention described above, the following advantageous effects are achieved.

According to a preferred embodiment of the present invention, as described above, the controller 3 is configured or programmed to perform a control to increase the turning amount of the marine vessel 100 according to the operation duration time in which the predetermined operation state of the operator (the joystick 40 and the switch 42) continues in the automatic marine vessel maneuvering mode. Accordingly, the turning amount of the marine vessel 100 is increased, and the marine vessel 100 is turned simply by continuing the predetermined operation state of the operator without repeatedly operating the operator in order to increase the turning amount of the marine vessel 100, unlike the conventional case. Therefore, complex and repetitive operations as in the conventional case are not required, and thus the operability is improved by significantly reducing or preventing complex operations to turn the marine vessel 100. Furthermore, the marine vessel 100 is turned by an intuitive operation.

According to a preferred embodiment of the present invention, as described above, the controller 3 is configured or programmed to perform a control to continue the automatic marine vessel maneuvering mode to hold a course even after turning the marine vessel in response to performing a control to turn the marine vessel 100 in the automatic marine vessel maneuvering mode. Accordingly, the automatic marine vessel maneuvering mode to hold a course is continued even after the turning, and thus it is not necessary to set the automatic marine vessel maneuvering mode to hold a course again after the turning. Consequently, the operability of the marine vessel 100 is further improved.

According to a preferred embodiment of the present invention, as described above, the controller 3 is configured or programmed to perform a control to increase the turning amount by the first angular amount in a stepwise manner every fixed period of time when the predetermined operation state of the operator (the joystick 40 and the switch 42) continues. Accordingly, the turning amount is increased by the first angular amount in a stepwise manner every fixed period of time that the operator is operated, and thus the marine vessel 100 is turned while an increase in the turning amount is linked to the user's sense of time. Therefore, the marine vessel 100 is turned by a more intuitive operation.

According to a preferred embodiment of the present invention, as described above, the controller 3 is configured or programmed to perform a control to increase the turning amount by the second angular amount smaller than the first angular amount when the predetermined operation state of the operator (the joystick 40 and the switch 42) is ended within the time shorter than the fixed period of time. Accordingly, the turning amount is finely adjusted by the second angular amount in a range smaller than the first angular amount.

According to a preferred embodiment of the present invention, as described above, the first angular amount is, for example, 5 degrees or more, and the second angular amount is less than 5 degrees, for example. Accordingly, the turning amount is roughly set by a relatively large first angular amount of 5 degrees or more, and the turning amount is finely adjusted by a relatively small second angular amount of less than 5 degrees.

According to a preferred embodiment of the present invention, as described above, the turning amount of the marine vessel 100 is less than 180 degrees, for example. Accordingly, the marine vessel 100 is prevented from rotationally turning half a turn or more.

According to a preferred embodiment of the present invention, as described above, the operator includes the joystick 40 that is able to be rotatably operated and tiltably operated, and the controller 3 is configured or programmed to perform a control to increase the turning amount in a stepwise manner according to the operation duration time in which the rotated state of the joystick 40 rotated in the predetermined direction from the reference position continues. Accordingly, the turning amount is increased in a stepwise manner simply by rotating the joystick 40, and thus the operability is further improved by significantly reducing or preventing complex operations to turn the marine vessel 100. Furthermore, the marine vessel 100 is turned by a more intuitive operation.

According to a preferred embodiment of the present invention, as described above, the controller 3 is configured or programmed to perform a control to offset the course of the marine vessel 100 to the left side and the right side based on a leftward tilting operation and a rightward tilting operation on the joystick 40, respectively, in the automatic marine vessel maneuvering mode. Accordingly, not only the function of receiving an operation to turn the marine vessel 100 but also the function of receiving an operation to offset the marine vessel 100 is integrated in the joystick 40, and thus the operability of the marine vessel 100 by the joystick 40 is improved.

According to a preferred embodiment of the present invention, as described above, the controller 3 is configured or programmed to perform a control to increase the offset amount in a stepwise manner each time the joystick 40 is repeatedly tilted to one of the left side and the right side. Accordingly, the course of the marine vessel 100 is offset simply by tilting the joystick 40, and the offset amount is increased in a stepwise manner simply by repeating the tilting operation. Thus, the marine vessel 100 is easily offset by the joystick 40.

According to a preferred embodiment of the present invention, as described above, the controller 3 is configured or programmed to perform a control to cancel the offset of the marine vessel 100 when the joystick 40 is tilted to one of the left side and the right side after the joystick 40 is tilted to the other of the left side and the right side and before the offset of the marine vessel 100 is completed. Accordingly, the offset of the marine vessel 100 is canceled by the joystick 40 before the offset of the marine vessel 100 is completed, and thus the course is corrected at an early stage without waiting for the completion of the offset of the marine vessel 100.

According to a preferred embodiment of the present invention, as described above, the controller 3 is configured or programmed to perform a control to cancel the offset amount by one of a leftward tilting operation and a rightward tilting operation performed again on the joystick 40, set the predetermined offset amount in the same direction as the offset direction before the cancellation from the position of the marine vessel 100 at the time of the tilting operation performed again, and offset the marine vessel 100 again when the predetermined period of time elapses from receiving one of a leftward tilting operation and a rightward tilting operation on the joystick 40 after one of the leftward tilting operation and the rightward tilting operation on the joystick 40 is performed and before the offset of the marine vessel 100 is completed. Accordingly, the offset is canceled substantially at the same time as resetting the predetermined offset amount by a single operation, and thus the operability of the marine vessel 100 is improved.

According to a preferred embodiment of the present invention, as described above, the controller 3 is configured or programmed to perform a control to cancel the offset of the marine vessel 100 and turn the marine vessel 100 when the joystick 40 is rotated after the joystick 40 is tilted to one of the left side and the right side and before the offset of the marine vessel 100 is completed. Accordingly, the offset of the marine vessel 100 is canceled substantially at the same time as the control to turn the marine vessel 100 by a single operation, and thus the operability of the marine vessel 100 is improved. In addition, the marine vessel 100 is immediately shifted from offset to turning.

According to a preferred embodiment of the present invention, as described above, the controller 3 is configured or programmed to perform a control to offset the course of the marine vessel 100 to the left side and the right side based on a leftward tilting operation and a rightward tilting operation on the joystick 40, respectively, in the automatic marine vessel maneuvering mode, and to perform a control to cancel turning of the marine vessel 100 and offset of the marine vessel 100 when the joystick 40 is tilted to the left side or the right side after the joystick 40 is rotated and before the turning of the marine vessel 100 is completed. Accordingly, the turning of the marine vessel 100 is canceled substantially at the same time as the control to offset the marine vessel 100 by a single operation, and thus the operability of the marine vessel 100 is improved. In addition, the marine vessel 100 is immediately shifted from turning to offset.

According to a preferred embodiment of the present invention, as described above, the controller 3 is configured or programmed to perform a control to change the speed of the marine vessel 100 based on a forward tilting operation and a rearward tilting operation on the joystick 40 in the automatic marine vessel maneuvering mode. Accordingly, not only the function of receiving an operation to turn the marine vessel 100 but also the function of receiving an operation to change the speed of the marine vessel 100 is integrated in the joystick 40, and thus the operability of the marine vessel 100 by the joystick 40 is improved.

According to a preferred embodiment of the present invention, as described above, the operator includes a pressable switch, and the controller 3 is configured or programmed to perform a control to increase the turning amount in a stepwise manner according to the operation duration time in which the pressed state of the switch continues. Accordingly, the turning amount is increased in a stepwise manner simply by pressing the switch, and thus the marine vessel 100 is turned by a more intuitive operation.

According to a preferred embodiment of the present invention, as described above, the steering control system 101 further includes the display 7 to schematically display the marine vessel 100, the target orientation of the marine vessel 100, and the course of the marine vessel 100 in the automatic marine vessel maneuvering mode. Accordingly, the movement state of the marine vessel 100 is easily understood by the user in the automatic marine vessel maneuvering mode via the display 7.

The preferred embodiments of the present invention described above are illustrative in all points and not restrictive. The extent of the present invention is not defined by the above description of the preferred embodiments but by the scope of the claims, and all modifications (modified examples) within the meaning and range equivalent to the scope of the claims are further included.

For example, while the example in which the marine vessel 100 is an outboard motor boat has been shown in preferred embodiments described above, the present invention is not restricted to this. That is, the marine vessel may be a marine vessel other than an outboard motor boat. For example, the marine vessel may be a marine vessel including an inboard motor(s), an inboard-outboard motor(s), or a jet propulsion device(s).

While the process operations performed by the controller are described using flowcharts in a flow-driven manner in which processes are performed in order along a process flow for the convenience of illustration in preferred embodiments described above, the present invention is not restricted to this. In the present invention, the process operations performed by the controller may be performed in an event-driven manner in which the processes are performed on an event basis. In this case, the process operations performed by the controller may be performed in a complete event-driven manner or in a combination of an event-driven manner and a flow-driven manner.

While the example in which the operator includes a joystick and a switch has been shown in preferred embodiments described above, the present invention is not restricted to this. In the present invention, the operator according may include only one of a joystick and a switch. Alternatively, the operator may include an operator other than a joystick and a switch.

While the example in which the marine vessel includes two outboard motors has been shown in preferred embodiments described above, the present invention is not restricted to this. In the present invention, the marine vessel may include one or three or more outboard motors.

While the example in which the turning amount is increased in two stages of the first angular amount and the second angular amount has been shown in preferred embodiments described above, the present invention is not restricted to this. In the present invention, the turning amount may be increased in three stages (or more than three stages) of the first angular amount, the second angular amount, and a third angular amount larger than the first angular amount.

While the example in which the first angular amount is 5 degrees has been shown in preferred embodiments described above, the present invention is not restricted to this. In the present invention, the first angular amount may be an angle larger than 5 degrees.

While the example in which the second angular amount is 1 degree has been shown in preferred embodiments described above, the present invention is not restricted to this. In the present invention, the second angular amount may be an angle larger than 1 degree or an angle smaller than 1 degree in a range of less than 5 degrees.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A steering control system for a marine vessel, the steering control system comprising:
   a controller configured or programmed to perform a control to turn the marine vessel so as to change a target orientation in an automatic marine vessel maneuvering mode that holds a course in which the marine vessel is moved; and
   an operator to receive a predetermined operation to cause the controller to turn the marine vessel; wherein
   the operator includes a joystick that is able to be rotatably operated and tiltably operated;
   the controller is configured or programmed to perform a control to increase a turning amount of the marine vessel according to an operation duration time in which a predetermined operation state of the joystick continues;
   the controller is further configured or programmed to perform a control to offset the course of the marine vessel to a left side or a right side by a predetermined distance while continuing movement of the marine vessel based on a leftward tilting operation or a rightward tilting operation on the joystick in the automatic marine vessel maneuvering mode; and
   the controller is configured or programmed to move the course of the marine vessel the predetermined distance to the left or the right for each tilting operation of the joystick.

2. The steering control system according to claim 1, wherein the controller is further configured or programmed to perform a control to continue the automatic marine vessel maneuvering mode after turning of the marine vessel in response to the control to turn the marine vessel in the automatic marine vessel maneuvering mode.

3. The steering control system according to claim 1, wherein the controller is further configured or programmed to perform a control to increase the turning amount by a first angular amount in a stepwise manner every fixed period of time when the predetermined operation state of the operator continues.

4. The steering control system according to claim 3, wherein the controller is further configured or programmed to perform a control to increase the turning amount by a second angular amount smaller than the first angular amount when the predetermined operation state of the operator is ended within a time shorter than the fixed period of time.

5. The steering control system according to claim 4, wherein
   the first angular amount is 5 degrees or more; and
   the second angular amount is less than 5 degrees.

6. The steering control system according to claim 1, wherein the turning amount of the marine vessel is less than 180 degrees.

7. The steering control system according to claim 1, wherein
   the controller is further configured or programmed to perform a control to increase the turning amount in a stepwise manner according to the operation duration time in which a rotated state of the joystick rotated in a predetermined direction from a reference position continues.

8. The steering control system according to claim 7, wherein the controller is further configured or programmed to perform a control to increase an offset amount in a stepwise manner each time the joystick is repeatedly tilted to one of the left side and the right side.

9. The steering control system according to claim 7, wherein the controller is further configured or programmed to perform a control to cancel the offset of the marine vessel when the joystick is tilted to one of the left side and the right side after the joystick is tilted to the other of the left side and the right side and before the offset of the marine vessel is completed.

10. The steering control system according to claim 7, wherein the controller is further configured or programmed to perform a control to cancel an offset amount by one of the leftward tilting operation and the rightward tilting operation being performed again on the joystick, set a predetermined offset amount in a same direction as an offset direction before cancellation of the offset amount from a position of the marine vessel at a time of the tilting operation being performed again, and offset the marine vessel again when a predetermined period of time elapses from receiving the tilting operation after one of the leftward tilting operation and the rightward tilting operation on the joystick is performed and before an offset of the marine vessel is completed.

11. The steering control system according to claim 7, wherein the controller is further configured or programmed to perform a control to cancel the offset of the marine vessel and turn the marine vessel when the joystick is rotated after the joystick is tilted to one of the left side and the right side and before the offset of the marine vessel is completed.

12. The steering control system according to claim 7, wherein the controller is further configured or programmed to:
  perform a control to cancel turning of the marine vessel and perform the offset of the course of the marine vessel when the joystick is tilted to the left side or the right side after the joystick is rotated and before the turning of the marine vessel is completed.

13. The steering control system according to claim 7, wherein the controller is further configured or programmed to perform a control to change a speed of the marine vessel based on a forward tilting operation and a rearward tilting operation on the joystick in the automatic marine vessel maneuvering mode.

14. The steering control system according to claim 1, wherein
  the operator includes a pressable switch; and
  the controller is further configured or programmed to perform a control to increase the turning amount in a stepwise manner according to the operation duration time in which a pressed state of the pressable switch continues.

15. The steering control system according to claim 1, further comprising:
  a display to schematically display the marine vessel, the target orientation of the marine vessel, and a course of the marine vessel in the automatic marine vessel maneuvering mode.

16. A marine vessel comprising:
  a hull;
  a controller configured or programmed to perform a control to turn the hull so as to change a target orientation in an automatic marine vessel maneuvering mode that holds a course in which the hull is moved; and
  an operator to receive a predetermined operation to cause the controller to turn the hull; wherein
  the operator includes a joystick that is able to be rotatably operated and tiltably operated;
  the controller is further configured or programmed to perform a control to increase a turning amount of the hull according to an operation duration time in which a predetermined operation state of the joystick continues;
  the controller is further configured or programmed to perform a control to offset the course of the marine vessel to a left side or a right side by a predetermined distance while continuing movement of the marine vessel based on a leftward tilting operation or a rightward tilting operation on the joystick in the automatic marine vessel maneuvering mode and
  the controller is configured or programmed to move the course of the marine vessel the predetermined distance to the left or the right for each tilting operation of the joystick.

17. The marine vessel according to claim 16, wherein the controller is further configured or programmed to perform a control to continue the automatic marine vessel maneuvering mode after turning of the hull in response to the control to turn the hull in the automatic marine vessel maneuvering mode.

18. A steering control method of a marine vessel, the method comprising:
  turning the marine vessel so as to change a target orientation in an automatic marine vessel maneuvering mode that holds a course in which the marine vessel is moved; and
  increasing a turning amount of the marine vessel in a stepwise manner based on a predetermined operation state of an operator continuing during a control in the automatic marine vessel maneuvering mode, the operator including a joystick that is able to be rotatably operated and tiltably operated; and
  performing a control to offset the course of the marine vessel to a left side or a right side by a predetermined distance while continuing movement of the marine vessel based on a leftward tilting operation or a rightward tilting operation on the joystick in the automatic marine vessel maneuvering mode; wherein
  the course of the marine vessel is moved the predetermined distance to the left or the right for each tilting operation of the joystick.

19. The steering control method according to claim 18, wherein the turning of the marine vessel so as to change the target orientation in the automatic marine vessel maneuvering mode includes continuing the automatic marine vessel maneuvering mode after the turning of the marine vessel.

* * * * *